(12) United States Patent
Gysling

(10) Patent No.: US 9,046,399 B2
(45) Date of Patent: Jun. 2, 2015

(54) MINIMALLY INTRUSIVE MONITORING OF A MULTIPHASE PROCESS FLOW USING A TRACER AND A SPATIALLY ARRANGED ARRAY OF AT LEAST TWO SENSORS ON A FLOW PIPE

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 378 days.

(21) Appl. No.: 13/161,319

(22) Filed: Jun. 15, 2011

(65) Prior Publication Data

US 2011/0303019 A1    Dec. 15, 2011

Related U.S. Application Data

(60) Provisional application No. 61/355,033, filed on Jun. 15, 2010, provisional application No. 61/355,007, filed on Jun. 15, 2010, provisional application No. 61/378,209, filed on Aug. 30, 2010.

(51) Int. Cl.
| | |
|---|---|
| *G01F 1/74* | (2006.01) |
| *G01F 1/704* | (2006.01) |
| *G01F 1/66* | (2006.01) |
| *G01F 1/708* | (2006.01) |
| *G01F 1/712* | (2006.01) |
| *G01F 25/00* | (2006.01) |

(52) U.S. Cl.
CPC *G01F 1/74* (2013.01); *G01F 1/704* (2013.01); *G01F 1/7082* (2013.01); *G01F 1/712* (2013.01); *G01F 25/0023* (2013.01)

(58) Field of Classification Search
None
See application file for complete search history.

(56) References Cited

U.S. PATENT DOCUMENTS

| | | | |
|---|---|---|---|
| 6,016,191 | A | 1/2000 | Ramos et al. |
| 6,023,340 | A | 2/2000 | Wu et al. |
| 7,237,440 | B2 | 7/2007 | Gysling et al. |
| 7,389,187 | B2 | 6/2008 | Kersey et al. |
| 7,454,981 | B2 | 11/2008 | Gysling |
| 7,469,597 | B2 | 12/2008 | Flaten et al. |
| 2007/0157737 | A1 | 7/2007 | Gysling |

(Continued)

FOREIGN PATENT DOCUMENTS

| | | |
|---|---|---|
| EP | 0167233 | 1/1986 |
| WO | 2011/019829 | 2/2011 |

*Primary Examiner* — Harshad R Patel
(74) *Attorney, Agent, or Firm* — O'Shea Getz P.C.

(57) ABSTRACT

An apparatus for and a method of monitoring multiphase fluid flow passing within a pipe is provided. The method includes the steps of: a) providing a flow pressure value and a flow temperature value for the multiphase fluid flow within the pipe; b) sensing the fluid flow with a fluid flow meter operable to be attached to an exterior of the pipe, the flowmeter including a spatial array of at least two sensors disposed at different axial positions along the pipe, and producing flow velocity signals indicative of a velocity of the fluid flow traveling within the pipe; c) selectively injecting at least one tracer into the fluid flow passing within the pipe, at a known injection flow rate and concentration; d) sensing a sample of the fluid flow for the tracer, and producing tracer concentration signals indicative of the concentration of the tracer in the fluid flow; and e) determining one or more of a gas component flow rate, an oil component flow rate, and a water component flow rate, using one or more of the flow pressure value, the flow temperature value, the flow velocity signals, and the tracer concentration signals.

20 Claims, 6 Drawing Sheets

(56) References Cited

U.S. PATENT DOCUMENTS

2008/0236298 A1 10/2008 Gysling
2010/0305882 A1 12/2010 Gysling

MINIMALLY INTRUSIVE MONITORING OF A MULTIPHASE PROCESS FLOW USING A TRACER AND A SPATIALLY ARRANGED ARRAY OF AT LEAST TWO SENSORS ON A FLOW PIPE

The present application is entitled to the benefit of and incorporates by reference essential subject matter disclosed in the following U.S. Provisional Patent Applications: Ser. Nos. 61/355,033, filed Jun. 15, 2010; 61/355,007, filed Jun. 15, 2010; and 61/378,209, filed Aug. 30, 2010.

BACKGROUND OF THE INVENTION

1. Technical Field

This disclosure relates to monitoring a multiphase process flow using a tracer.

2. Background Information

Measuring multiphase process flows that vary in composition is desirable, particularly in the oil and gas industry. An accurate measure of oil and/or gas flow is important for a wide range of oil and gas applications. Prior art oil and/or gas flow measurement equipment, however, is typically expensive and difficult to implement. Examples of such prior art flow measurement equipment include inline multiphase flowmeters and test separators.

During separation and examination processes, a user can manually vent (or flash) the sample to ambient pressure, physically handle the sample, and dispose of the sample after examination. The afore-described manual separation and examination process can, however, be time consuming and prone to human error.

SUMMARY OF THE INVENTION

According to an aspect of the present invention, a method of monitoring multiphase fluid flow passing within a pipe, which multiphase fluid includes a gas component, an oil component, and a water component, is provided. The method includes the steps of: a) providing a flow pressure value and a flow temperature value for the multiphase fluid flow within the pipe; b) sensing the fluid flow with a fluid flow meter operable to be attached to an exterior of the pipe, the flowmeter including a spatial array of at least two sensors disposed at different axial positions along the pipe, and producing flow velocity signals indicative of a velocity of the fluid flow traveling within the pipe; c) selectively injecting at least one tracer into the fluid flow passing within the pipe, at a known injection flow rate and concentration; d) sensing a sample of the fluid flow for the tracer, and producing tracer concentration signals indicative of the concentration of the tracer in the fluid flow; and e) determining one or more of a gas component flow rate, an oil component flow rate, and a water component flow rate, using one or more of the flow pressure value, the flow temperature value, the flow velocity signals, and the tracer concentration signals.

According to another aspect of the present invention, an apparatus for monitoring a multiphase fluid flow passing within a pipe is provided that includes a fluid flow meter, a tracer measurement system, and a processing device. The fluid flow meter is operable to be attached to an exterior of the pipe. The fluid flow meter includes a spatial array of at least two sensors disposed at different axial positions along the pipe, and is adapted to produce flow velocity signals indicative of a velocity of the fluid flow traveling within the pipe. The tracer measurement system includes a tracer injection device and a tracer measurement device. The tracer injection device is operable to inject one or more tracers into the fluid flow disposed within the pipe. The tracer measurement device is connected to the pipe downstream of the tracer injection device, and is operable to sense a sample of the fluid flow for the injected tracers, and produce tracer concentration signals representative of a concentration of one or more of the tracers within the sample. The processing device is adapted to receive the flow velocity signals and the tracer concentration signals and determine one or more of a gas component flow rate, an oil component flow rate, and a water component flow rate, using one or more of a flow pressure value, a flow temperature value, the flow velocity signals, and the tracer concentration signals.

The present method and advantages associated therewith will become more readily apparent in view of the detailed description provided below, including the accompanying drawings.

These and other features and advantages of the present invention will become apparent in light of the drawings and detailed description of the present invention provided below.

DETAILED DESCRIPTION OF THE INVENTION

Figure 1:
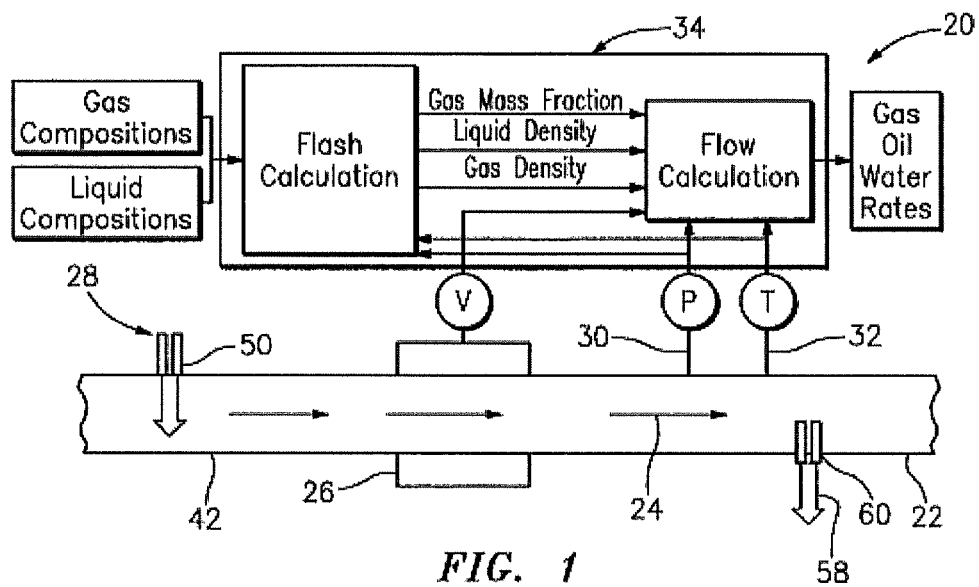
FIG. 1 is a diagrammatic view of an embodiment of a system for monitoring fluid flow within a pipe.

FIG. 1 diagrammatically illustrates an embodiment of a system 20 for monitoring a single or multiphase process fluid flow passing within a pipe 22. The fluid flow 24 can include, for example, a gas component and one or more liquid components such as an oil component and a water component. The system includes a clamp-on flow meter 26, a tracer measurement system 28, a pressure transducer 30, a temperature transducer 32, and a processor 34 that receives measurement signals from the flow meter 26, and in some embodiments signals from the tracer measurement system 28.

Figure 2:
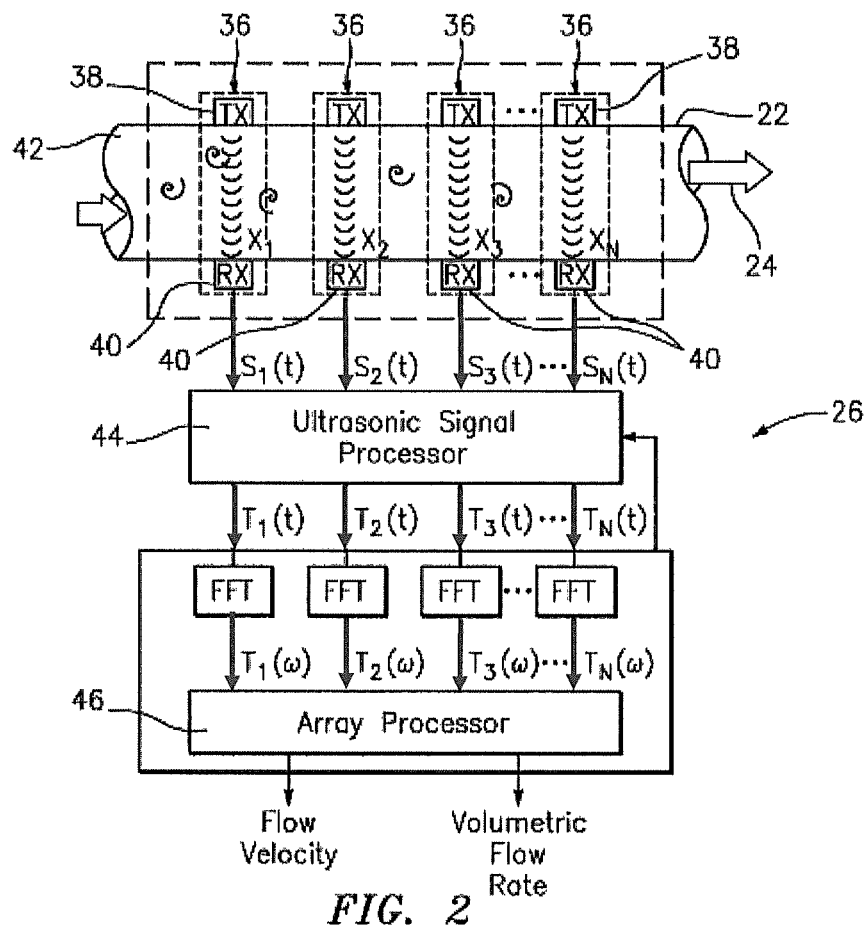
FIG. 2 is a diagrammatic view of a flow meter.

Referring to FIG. 2, an embodiment of the flow meter 26 includes an array of ultrasonic sensor units, sometimes referred to as a "SONAR" flow meter 26. Each sensor unit 36 comprises a pair of ultrasonic sensors, one of which functions as a transmitter (Tx) 38 and the other as a receiver (Rx) 40. The sensor units 36 are spaced axially along the outer surface 42 of a pipe 22 having a process fluid flow passing therethrough. The pair of sensors 38, 40 is diametrically disposed on the pipe 22 at predetermined locations along the pipe 22 to provide a through transmission configuration, such that the sensors 38, 40 transmit and receive an ultrasonic signal that propagates through the fluid flow 24 substantially orthogonal to the direction of the fluid flow 24 within the pipe 22.

Each pair of ultrasonic sensors 38, 40 measures a transit time (i.e., time of flight (TOF), or phase modulation) of an ultrasonic signal propagating through the fluid 24 from the transmitting sensor 38 to the receiving sensor 40. The transit time measurement or variation is indicative of coherent properties that convect with the flow within the pipe 22 (e.g., vortical disturbances, inhomogenieties within the flow, temperature variations, bubbles, particles, pressure disturbances), which are indicative of the velocity of the process flow. The ultrasonic sensors 36 may operate at any frequency; however, it has been found that the higher frequency sensors are more suitable for single phase fluids while lower frequency sensors are more suitable for multiphase fluids. The optimum frequency of the ultrasonic sensors 36 is dependent on the size or type of particle or substance propagating with the flow. The ultrasonic sensors 36 may also provide a pulsed, chirped or continuous signal through the fluid flow 24. An example of the sensors 36 that may be used are Model no. 113-241-591, manufactured by Krautkramer Ultrasonic Systems.

An ultrasonic signal processor 44 fires the sensors 36 in response to a firing signal from the transmitter and receives the ultrasonic output signals $S_{1(t)}$-$S_{N(t)}$ from the sensors 36. The signal processor 44 processes the data from each of the sensor units 36 to provide an analog or digital output signal $T_{1(t)}$-$T_{N(t)}$ indicative of the time of flight or transit time of the ultrasonic signal through the fluid 24. The signal processor 44 may also provide an output signal indicative of the amplitude (or attenuation) of the ultrasonic signals. One such signal processor is model no. USPC 2100 manufactured by Krautkramer Ultrasonic Systems.

The output signals ($T_{1(t)}$-$T_{N(t)}$) of the ultrasonic signal processor 44 are provided to an array processor 46, which processes the transit time measurement data to determine the volumetric flow rate. The transit time or time of flight measurement is defined by the time it takes for an ultrasonic signal to propagate from the transmitting sensor 38 to the respective receiving sensor 40 through the pipe wall and the fluid 24. The effect of the vortical disturbances (and/or other inhomogenieties within the fluid) on the transit time of the ultrasonic signal is to delay or speed up the transit time. Therefore, each sensing unit 36 provides a respective output signal $T_{1(t)}$-$T_{N(t)}$ indicative of the variations in the transit time of the ultrasonic signals propagating orthogonal to the direction of the fluid 24. The measurement is derived by interpreting the convecting coherent property and/or characteristic within the fluid 24 passing within the pipe 22 using at least two sensor units 36. The ultrasonic sensors 36 are preferably packaged within a housing that can be clamped on to the exterior surface of the pipe 22; i.e., applied in a non-intrusive manner.

The flow meter 26 can measure the volumetric flow rate within the pipe 22 by, for example, determining the velocity of vortical disturbances or "eddies" propagating with the flow using the array of ultrasonic sensors. The flow meter 26 measures the velocities associated with unsteady flow fields created by vortical disturbances or "eddies" and other inhomogenities to determine the velocity of the flow. The ultrasonic sensor units 36 measure the transmit time $T_{1(t)}$-$T_{N(t)}$ of the respective ultrasonic signals between each respective pair of sensors 38, 40 which vary due to the vortical disturbances as these disturbances convect within the flow through the pipe 22 in a known manner. Therefore, the velocity of these vortical disturbances is related to the velocity of the flow 24 and hence the volumetric flow rate may be determined by multiplying the velocity of the fluid flow 24 by the cross-sectional area of the pipe 22.

Figure 3:
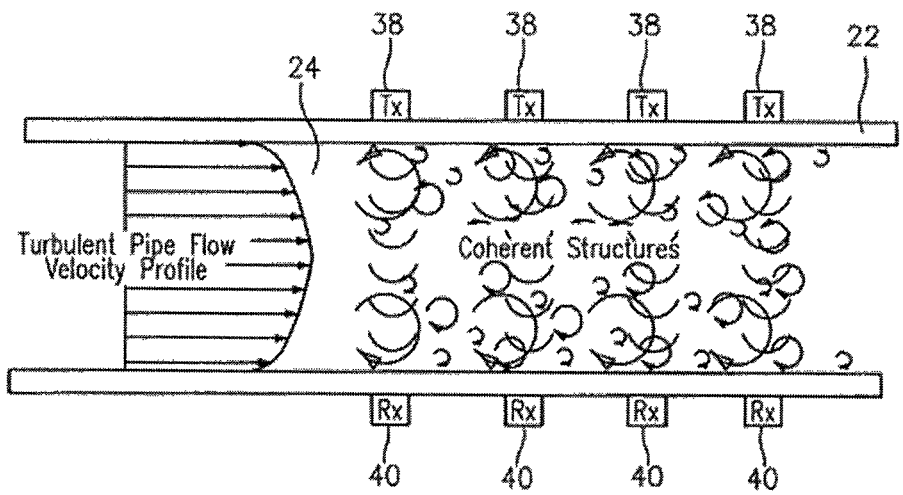
FIG. 3 is a diagrammatic view of fluid flow within a pipe

FIG. 3 illustrates the relevant flow features of turbulent pipe fluid flow 24 along with an axial array of ultrasonic sensor units 36, each sensor unit having a transmitter 38 and a receiver 40. As shown, the time-averaged axial velocity is a function of radial position, from zero at the wall to a maximum at the centerline of the pipe 22. The fluid flow 24 near the wall is characterized by steep velocity gradients and transitions to relatively uniform core flow near the center of the pipe 22. Vortical structures are superimposed over time averaged velocity profile. These coherent structures contain temporally and spatially random fluctuations with magnitudes typically less than 10% percent of the mean flow velocity and are carried along with the mean flow. Experimental investigations have established that eddies generated within turbulent boundary layers remain coherent for several pipe diameters and convect at roughly 80% of maximum flow velocity (Schlichting, 1979).

The above described flow meter 26 and associated signal processing are described in U.S. Pat. No. 7,389,187, which patent is hereby incorporated by reference into the present application in its entirety. The aforesaid flow meter 26 is an example of a clamp-on flow meter 26 that can be used to determine flow velocity within the pipe 22. A clamp-on flow meter 26 is advantageous because it does not create a flow impediment within the interior passage of the pipe 22, is not impacted by and subject to wear by the fluid flow 24, and does not require installation within the pipe 22 or modification of existing piping. Hence, the aforesaid flow meter 26 can be used in an existing pipe flow application.

The above described flow meter 26 includes an ultrasonic signal processor 44 and an array processor 46. These processors and others associated with the present system can be independent of one another, but in signal communication. Alternatively, the functionality provided by the processors may be combined into a single processor. For ease of description, the processor or processors will be collectively referred to hereinafter as a single processor 34.

In some embodiments, the processor 34 is adapted to include an equation of state model for the pressure, volume, and temperature properties for a multiphase hydrocarbon fluid flow 24 being evaluated. The equation of state model is typically referred to as a "PVT Model". PVT Models are commercially available; e.g., an acceptable PVT Model is the "PVTsim" model produced by Calsep A/S of Lyngby, Denmark. The processor 34 is further adapted to receive: 1) composition data representative of the fluid flow 24 (e.g., hydrocarbon fluid flow composition values—C1, C2, C3, . . . Cn); 2) flow pressure data (e.g., a flow pressure value from a pressure sensor; i.e., "P"); 3) flow temperature data (e.g., a flow temperature value from a temperature sensor; i.e., "T"); and 4) flow velocity data from the SONAR flow meter 26 ("$V_{SONAR}$"). Using the pressure and temperature values, the flow velocity determined from the flow meter 26, and the PVT Model, the processor 34 is adapted to determine the volumetric flow rates of one or both the gas and liquid phases of the fluid flow 24 at one or both of the actual temperature and pressure or a standard temperature and pressure (e.g., ambient temperature and pressure). An initial value set for the fluid flow composition can be based on historical data, empirical testing, etc. The composition values (e.g., C1, C2, C3, . . . Cn) can be adjusted as necessary to increase the accuracy of the values relative to the actual flow 24.

The processor 34 that is adapted to accept and produce the aforesaid inputs and outputs, respectively, may be a microprocessor, a personal computer, or other general purpose computer, or any type of analog or digital signal processing device adapted to execute programmed instructions. Further, it should be appreciated that some or all of the functions associated with the flow logic of the present invention may be implemented in software (using a microprocessor or computer) and/or firmware, or may be implemented using analog and/or digital hardware, having sufficient memory, interfaces, and capacity to perform the functions described herein. A processor incorporated or in communication with the flow meter 26, and adapted to include a PVT Model as described above is detailed in U.S. Patent Application Publication No. 2010/0305882 (U.S. patent application Ser. No. 12/788,050) and PCT Patent Application Serial No. PCT/US10/45187, filed Aug. 11, 2010, both of which are hereby incorporated by reference in their entirety.

Figure 4:
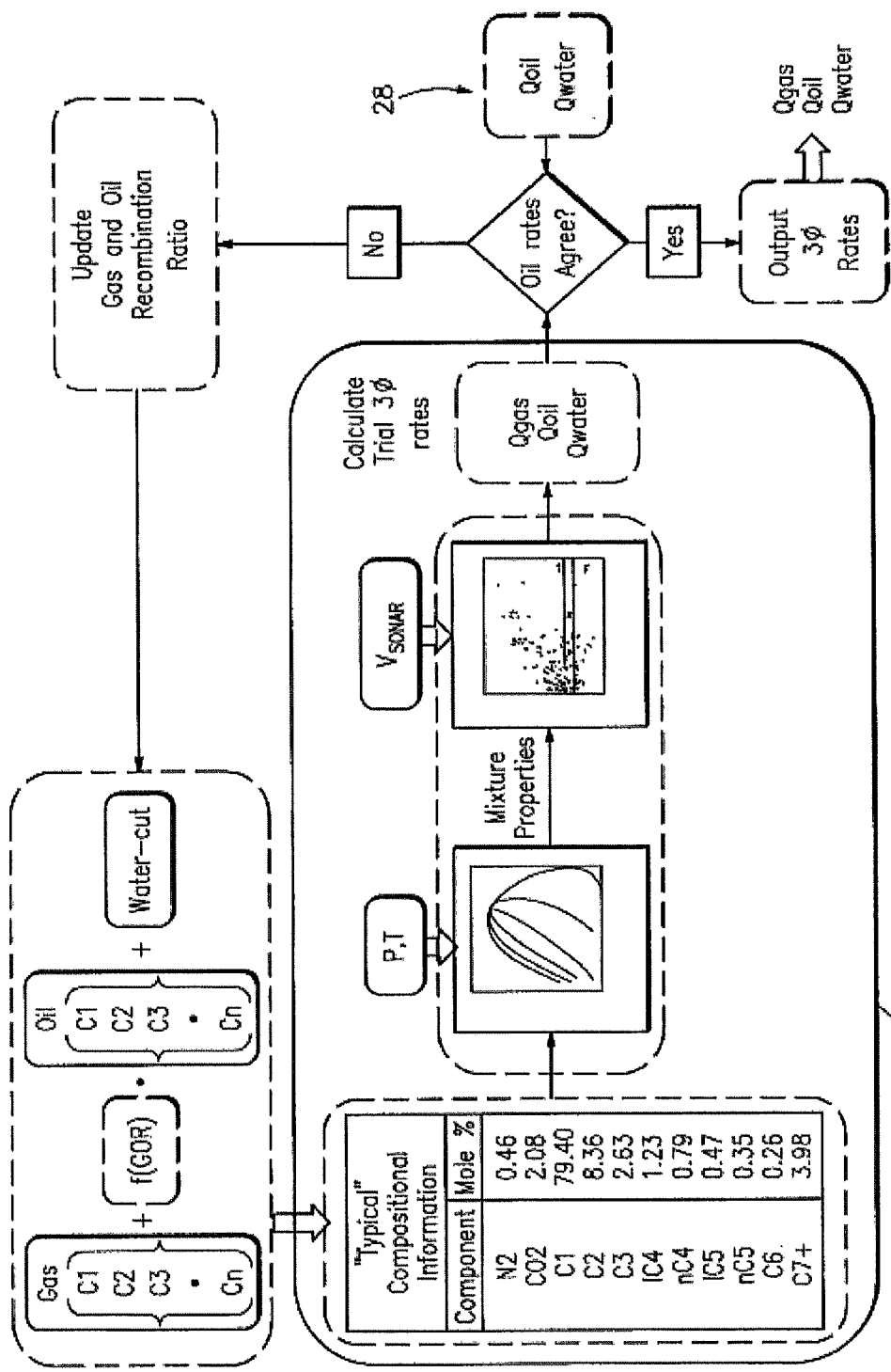
FIG. 4 is a diagrammatic view of an embodiment of a system for monitoring fluid flow within a pipe.

FIG. 4 is a schematic illustration of the embodiment the flow monitoring system shown in FIG. 1 The processor 34 is adapted to receive: 1) a set of fluid flow composition values (C1, C2, ... Cn); 2) flow pressure data (e.g., a flow pressure value from a pressure sensor; "P"); 3) flow temperature data (e.g., a flow temperature value from a temperature sensor; "T"); and 4) flow velocity data from the SONAR flow meter 26 ($V_{SONAR}$). With the received inputs, the processor 34 is adapted to calculate the flow rates for the gas component, the water component, and the gas component. One of the liquid component values (e.g., the oil flow rate) can then be compared (e.g., using an error function) against an oil component flow rate determined using the tracer measurement system 28 (as described below). If the error value (i.e., difference) is within an acceptable range of values or greater/less than a threshold value, one or more of the component flow rates can be reported. If the flow rates are determined at temperature and pressure values other than standard values, the processor is adapted to flash those flow rate values to analogous values at a predetermined standard temperature and pressure (STP).

If the error value between the "flow meter" calculated flow rate and tracer measurement system 28 determined flow rate is outside the acceptable range of values or less/greater than a threshold value (i.e., does not satisfy a predetermined condition), the processor 34 is adapted to produce a modified set of fluid flow composition values based on the initial set of fluid flow composition values, and iteratively repeat the above-described process using the modified values. The modification of the fluid flow composition values can be performed using a variety of different functions. An example of a function that can be used is as follows:

$$\begin{Bmatrix} c_1 \\ c_2 \\ c_n \end{Bmatrix}_{new} = \begin{Bmatrix} c_1 \\ c_2 \\ c_n \end{Bmatrix}_{gas} + \Pi \begin{Bmatrix} c_1 \\ c_2 \\ c_n \end{Bmatrix}_{liq} \quad \text{(Eqn. 1)}$$

where "Π" is a variable that is a function of the gas/oil ratio ("f(GOR)") of the composition, and which variable can be iteratively adjusted to improve the agreement between the measured values and the calculated values. An example of a "f(GOR)" variable is:

$$\gamma \frac{\#molesLiquid}{\#molesGas}$$

where "γ" is a variable that can be iteratively adjusted, and the number of moles of liquid and gas for the flow are determined for a particular pressure and temperature. The processor 34 is adapted to iteratively repeat the process until the error function is satisfied and the flow rates are reported. In this example, but not necessarily, the water cut value may be determined using known procedures and is considered a constant during processing.

Figure 5:
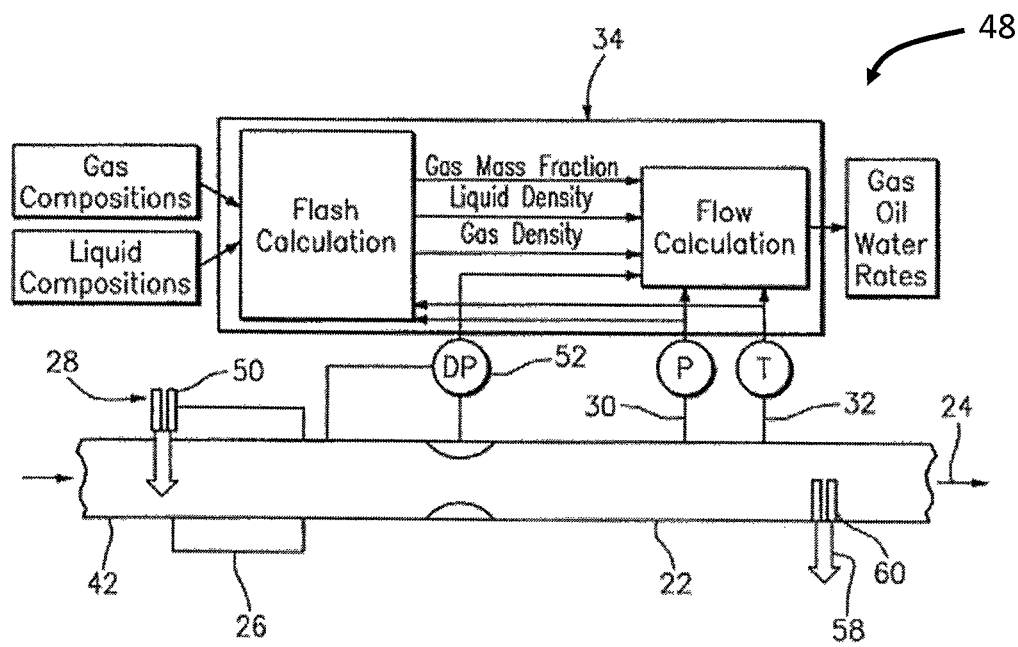
FIG. 5 is a diagrammatic view of an embodiment of a system for monitoring fluid flow within a pipe.

FIG. 5 diagrammatically illustrates another embodiment 48 of the flow monitoring system shown in FIG. 1 that further includes a differential pressure flow meter ("DP flow meter"). In this specific embodiment, the SONAR flow meter 26 is disposed adjacent to, and downstream of a tracer injection device 50, and the DP flow meter 52 is disposed downstream of the SONAR flow meter 26. DP flow meters 52 can be used to monitor gas production and are well-known to over-report the gas flow rate of a multiphase fluid flow 24 in the presence of liquids within the multiphase flow 24. The tendency of a DP flow meter 52 to over report due to wetness indicates a strong correlation with the liquid to gas mass ratio of the flow. As used herein, the term "Dflow meter" refers to a device that is operable to determine a pressure drop of a flow of fluid, or gas, or mixture thereof, traveling within a pipe 22 across a constriction within that pipe, or through a flow length of pipe. Examples of DP flow meters 52 that utilize a constriction include, but are not limited to, venturi, orifice, elbow, V-cone, and wedge type flowmeters. U.S. Patent Application Publication No. 2010/0305882 and PCT Patent Application Serial No. PCT/US10/45187 (both incorporated by reference above) describe algorithms operable to determine oil flow rate data, gas-to-oil ratio data, and compositional data of the flow.

The system embodiment shown in FIG. 5 utilizes both a SONAR flow meter 26 and a DP flow meter 52 to leverage the fact that SONAR flow meters 26 and DP flow meters 52 report gas flow rates differently in the presence of liquids within a multiphase flow. Specifically, although both SONAR flow meters 26 and DP flow meters 52 both "over report" the gas volume flow rate when liquid is present within a multiphase flow (i.e., a "wet gas flow"), the over report by the SONAR flow meter is substantially less than that of the DP flow meter for most liquid loadings. The relative insensitivity of the SONAR flow meter to "wetness" within the flow provides a practical means for accurately measuring the gas flow rate and the liquid flow rate of a wet gas flow. The use of a SONAR flow meter 26 and a DP flow meter 52 in concert to accurately determine the liquid and gas flow rates of a multiphase fluid flow is described in detail in U.S. Patent Publication No. 2008/0236298 (hereinafter referred to as "the '298 Publication"), which is hereby incorporated by reference herein its entirety.

In a system embodiment diagrammatically illustrated in FIG. 5, the processor 34 is adapted to receive: 1) a set of fluid flow composition values (C1, C2, ... Cn); 2) flow pressure data (e.g., a flow pressure value from a pressure sensor; "P"); 3) flow temperature data (e.g., a flow temperature value from a temperature sensor; "T"); 4) flow velocity data from the SONAR flow meter ($V_{SONAR}$); and 5) flow velocity data from the DP flow meter. With the received inputs from the flow meters, the processor 34 can calculate a fluid flow parameter value; e.g., a liquid gas mass ratio (LGMR). This fluid flow parameter reflects a "measured" value based on the fact that the data used to calculate the value is taken from the flow meters measuring the actual fluid flow. The processor 34 also determines a "calculated" value for the fluid flow parameter (e.g., a "calculated" LGMR) based on the PVT model, given the input pressure and temperature values. The calculated fluid flow parameter value is then compared to the measured fluid flow parameter value and an error function evaluates any difference between the values. If the error value is within an acceptable range of values or greater/less than a threshold value (either of which may be described as "satisfying a predetermined condition"), the flow rates of the fluid flow components can be determined. If the error value between the flow meter measured versus PVT model calculated fluid flow parameter values is outside the acceptable range of values or less/greater than a threshold value (i.e., does not satisfy a predetermined condition), the processor 34 is adapted to produce a modified set of fluid flow composition values based on the initial set of fluid flow composition values, and iteratively repeat the above-described process using the modified values. In this example, but not necessarily, the water cut value may be determined using known procedures and is considered a constant during processing. Once the error value is acceptable, then the flow rates of the fluid flow can be determined.

In this embodiment, once acceptable values for the flow rates of the fluid flow components are determined using the input from the flow meters 26, 52, one of the liquid component flow rates (e.g., the oil component flow rate) can then be compared against the same liquid component flow rate determined using the tracer measurement system 28 (as described below). The comparison can be used to evaluate and/or calibrate the system 20. In some embodiments, the comparison between the flow meter determined value and the tracer measurement system value 28 can be automated; e.g., using an iterative process with an error function as described above.

During operation, in addition to providing real time gas flow rate data, and periodic water flow rate data, as set forth above, the processor 34 can also provide real time oil flow rate data, periodic gas-to-oil ratio data using the measured flow velocity and the measured differential pressure, and gas and/or liquid compositional data. U.S. Patent Application Publication No. 2010/0305882, and PCT Patent Application Serial No. PCT/US10/45187 (both incorporated by reference above) describe algorithms operable to determine oil flow rate data, gas-to-oil ratio data, and compositional data of the flow.

Figure 6:
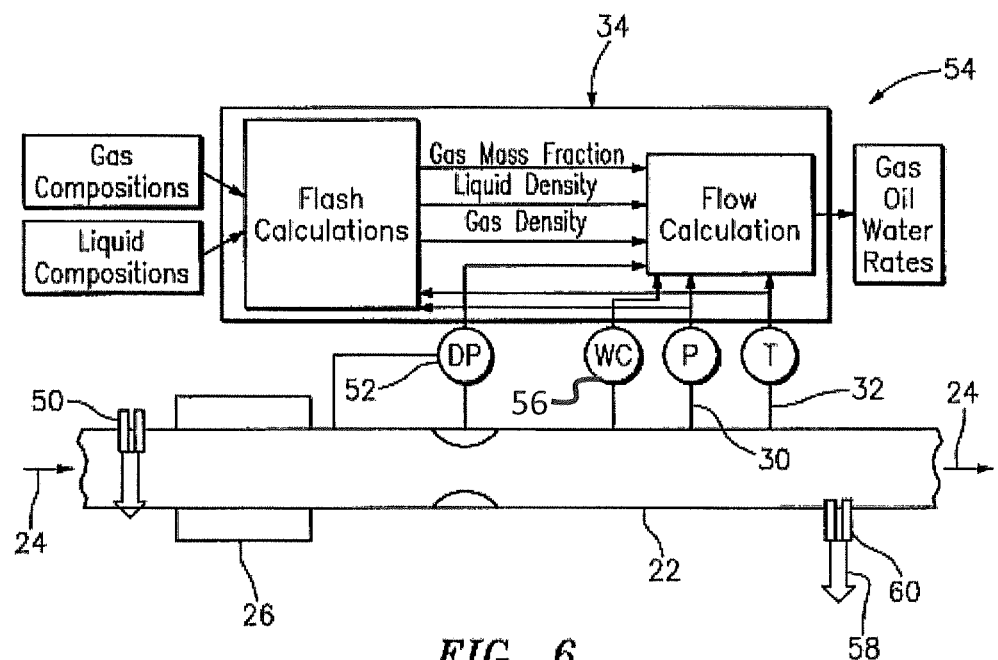
FIG. 6 is a diagrammatic view of an embodiment of a system for monitoring fluid flow within a pipe.

FIG. 6 diagrammatically illustrates another embodiment 54 of the flow monitoring system shown in FIG. 5 that further includes a water cut meter 56. In this specific embodiment, the water cut meter 56 is disposed between the DP meter 52 and the pressure transducer 30. During operation, the water cut meter 56 measures the water cut of the process fluid 24, and provides a signal indicative of the measured water cut. In addition to providing real time gas and oil flow rate data, and periodic gas-to-oil ratio data, as set forth above, the processor 34 can also provide real time water cut data and, thus, real time water flow rate data using the measured water cut. The water flow rate data can be calculated, for example, using a device like that described in PCT Patent Application Serial No. PCT/US 10/45187 (incorporated by reference above).

The SONAR flow meter 26 diagrammatically shown in FIG. 2 includes "active" sensors; i.e., sensors that emit a signal to acquire the desired information. In an alternative embodiment, the SONAR flow meter 26 can comprise a sensor array that is "passive"; i.e., a flow meter that utilizes pressure transducers or strain sensors to sense for the passage of pressure disturbances or sound waves traveling with the fluid flow 24. An example of such a flow meter is described in U.S. Pat. No. 7,237,440, which is hereby incorporated by reference in its entirety. In addition, in embodiments wherein the processor 34 uses compositional data input and is adapted with an equation of state, a DP flow meter may be used in place of the SONAR flow meter. As indicated above, however, the SONAR flow meter 26 provides the certain advantages over the DP flow meter.

In the embodiments shown in FIGS. 1-6, the tracer measurement system 28 can provide fluid flow phase information that can be used in real time, or can be used periodically to calibrate the present system. Advantageously, this periodic calibration, available on-site, can ensure that the flow rate and the gas-to-oil ratio data provided by the processing device accurately reflect characteristics of the process fluid flow 24.

The tracer measurement system 28 includes the tracer injection device 50 and a tracer measurement device 58. The injection device 50 and the sampling site 60 of the tracer measurement device 58 are preferably configured to utilize pre-existing tap sites on the pipe 22; i.e., pre-existing ports that provide fluid communication into the interior passage of the pipe 22. The tracer injection device 50 is disposed a distance upstream of the site 60 where the tracer measurement device 58 samples and senses the fluid flow 24. The distance between the tracer injection device 50 and the sample site 60 is chosen to ensure that the injected tracer is fully mixed with the fluid flow 24, or pertinent part thereof (e.g., a distance greater than 150 times a diameter of the pipe 22 is typically sufficient). In the embodiment shown in FIG. 1, the SONAR flow meter 26 is disposed between the tracer injection device 50 and the tracer sampling site 60, and the pressure and the temperature transducers 30, 32 are respectively disposed between the SONAR flow meter 26 and the tracer sampling site 60.

The tracer injection device 50 injects one or more tracers into the process flow 24 at known flow rates and concentrations. In the embodiment shown in FIG. 1, for example, the tracer injection device 50 injects a hydrophilic fluorescent tracer that mixes with the water component of the process flow 24, and a hydrophobic fluorescent tracer that mixes with the oil component of the process flow 24. The tracer measurement device 58 selectively samples the fluid flow 24; e.g., by extracting a pressurized or unpressurized sample of the fluid flow 24 via a tube or other fluid passage connected to a port on the pipe 22. The tracer measurement device 58 then senses the concentrations of the tracers associated with oil and the water components of the process flow 24 within the extracted sample of the flow using a fluorometer or similar device, and provides signals indicative of the sensed concentrations to the processor 34.

The processor 34 is adapted to process the signals from the SONAR flow meter 26 and the tracer measurement system 28 to provide real time volumetric flow rate data for a gas component of the process flow 24. The processor 34 is further adapted to process the signals from the SONAR flow meter 26 and the tracer measurement system 28 to selectively provide volumetric flow rate data for the oil and the water components of the process flow. The oil and the water flow rate data can be calculated, for example, using the following equations:

$$Q_{oil}=Q_{oiltracer}*(C_{oiltracer}/C_{oil}) \quad \text{(Eqn. 1)}$$

$$Q_{water}=Q_{watertracer}*(C_{watertracer}/C_{water}) \quad \text{(Eqn. 2)}$$

where $Q_{oil}$ is the flow rate of the oil component of the process flow 24, $Q_{water}$ is the flow rate of the water component of the process flow 24, $Q_{oiltracer}$ is the injection flow rate of the hydrophobic tracer that mixes with oil, $Q_{watertracer}$ is the injection flow rate of the hydrophilic tracer that mixes with water, $C_{oil}$ is the concentration of the oil in the process flow 24, $C_{water}$ is the concentration of the water in the process flow 24, $C_{oiltracer}$ is the concentration of the hydrophobic tracer injected into the process flow 24, and $C_{watertracer}$ is the concentration of the hydrophilic tracer injected into the process flow 24.

Figure 7:
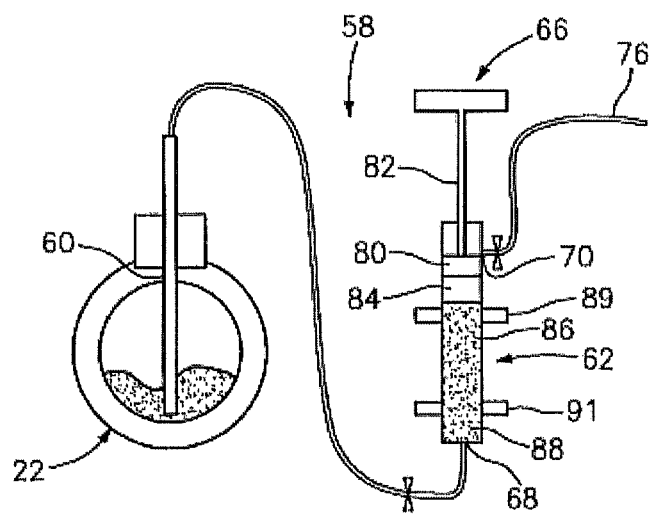
FIG. 7 is a diagrammatic view of an embodiment of a tracer extraction and measurement device.
Figure 8:
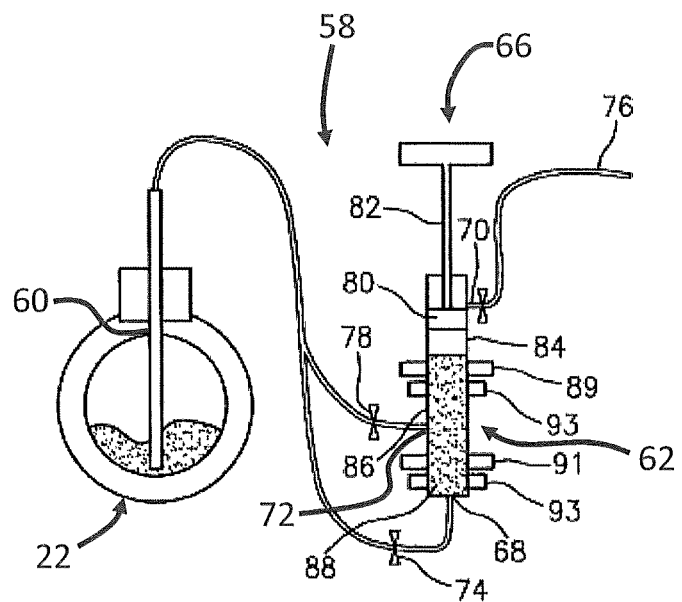
FIG. 8 is a diagrammatic view of an embodiment of a tracer extraction and measurement device.

FIGS. 7 and 8 diagrammatically illustrate two different embodiments of a tracer measurement device 58 that facilitates the sampling and sensing processes. The tracer measurement device 58 includes a vertically extending transparent separation chamber 62 and a fluid pressure source 66.

The separation chamber 62 includes a first flow port (i.e., an I/O) 68 and a gas flow port 70. Referring to the embodiment in FIG. 8, the separation chamber 62 can further include a second flow port 72. The first flow port 68 is disposed at the bottom of the separation chamber 62, and is fluidly connected to the pipe 22, for example, through a first flow valve 74. The gas flow outlet 70 is disposed proximate the top of the separation chamber 62, and is fluidly connected to a gas vent 76. The second flow port 72 is disposed proximate the middle of the separation chamber 62, and is also fluidly connected to the pipe 22, for example, through a second valve 78.

The fluid pressure source 66, which can be manually operable or powered, is adapted to increase or decrease pressure within the separation chamber 62. For example, in one specific embodiment, the fluid pressure source 66 comprises a piston 80 attached to a threaded shaft 82. The threaded shaft 82 can be rotated in a first direction, for example, to move the piston 80 toward the bottom of the separation chamber 62, and thereby increase the pressure within the separation chamber 62. The present invention, however, is not limited to the aforesaid example.

During operation of the tracer measurement device 58 in FIG. 8, the gas vent 76 and the first valve 74 are opened in order to establish a pressure differential between the pipe 22 and the separation chamber 62. The pressure differential forces a sample of the tracer diluted process flow 24 from the pipe 22 into the separation chamber 62. The gas vent 76 is then closed once a predetermined quantity of the process flow 34 enters the separation chamber 62. This in turn equalizes the pressure between the pipe 22 and the separation chamber 62. The first valve 74 is then closed. Alternatively, the gas vent 76 and the first valve 74 can be closed simultaneously such that the separation chamber 62 remains at a lower pressure. During the sample extraction, the second valve 78 is typically closed.

The sample remains undisturbed within the separation chamber 62 until the sample separates into its gas, oil and water components. In the specific embodiment shown in FIG. 7, gravity separates the components by density such that the gas component 84 is disposed at the top of the separation chamber 62, the oil component 86 is disposed at the top of a liquid column in the middle of the separation chamber 62, and the water component 88 is disposed at the bottom of the liquid column at the bottom of the separation chamber 62.

In some situations, however, disparate quantities of the oil and the water components 86, 88 can be disposed within the separation chamber 62. The first and/or the second valves 74, 78 (FIG. 8) can be operated during such situations to manipulate the oil-to-water ratio within the separation chamber 62. For example, in a situation when too much of the water component 88 has been extracted from the pipe 22, a portion of the water component 88 can be purged from the separation chamber 62 through the first valve 74. Alternatively, in a situation where too much of the oil component 86 has been extracted from the pipe 22, a portion of the oil component 86 can be purged from the separation chamber 62 through the second valve 78. The water or the oil component 86, 88 can be purged from the separation chamber 62 by increasing the pressure within the separation chamber 62 via the fluid pressure source 66. A respective one of the valves 74, 78 can then be opened such the water or oil component 88, 86 flows from the separation chamber 62 to the pipe 22. Additional process fluid can then be extracted from the pipe 22 to refill the separation chamber 62.

The concentration of each tracer within each component can then be measured. For example, the hydrophobic tracer $C_{oiltracer}$ mixed in with the oil component 86 can be measured using a fluorometer 89 aligned with the oil component 86, and the hydrophilic tracer $C_{watertracer}$ mixed in with the water component 88 can be measured using a fluorometer 91 aligned with the oil component 86. Signals indicative of the measured concentrations can be provided to processor 34 for further processing. FIG. 8 illustrates a pair of ultrasonic sensors 93 that can be used to determine the speed of sound in the respective components.

After the tracer concentrations have been measured, the sample is completely purged from the separation container 62. For example, the first and/or the second valves 74, 78 are opened. The fluid pressure source 66 then increases the pressure within the separator chamber 62 such that the sample flows through the valves back into the pipe 22. The present invention, however, is not limited to this method of purging the separator chamber 62. For example, the separator chamber 62 can first be pressurized before opening the first and/or the second valves 74, 78. Preferably, however, a gas cushion is maintained within the separator 62; e.g., between the piston 80 and the water and the oil components 86,88 to facilitate purging substantially all of the sample from the separator chamber 62.

Figure 9:
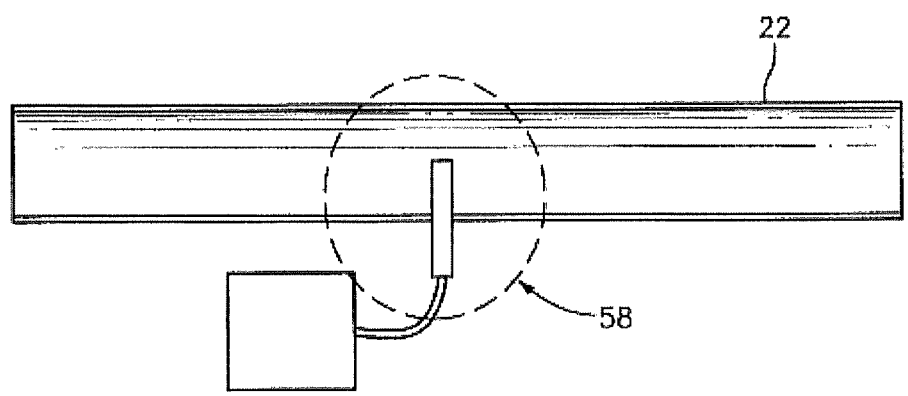
FIG. 9 is a diagrammatic view of a tracer measurement system embodiment.

FIG. 9 diagrammatically illustrates an embodiment of a tracer measurement device 58 operable to provide accurate oil and water flow rate measurements. As described above, a tracer injection device 50 is disposed upstream of the tracer measurement device 58. The tracer injection device 50 is adapted to inject one or more tracers/dyes into the process flow 24 at known flow rates and concentrations. Suitable tracers include hydrophilic tracers (e.g., hydrophilic fluorescent tracers) and hydrophobic tracers (e.g., hydrophobic fluorescent tracers). Other types of tracers/dyes, however, may additionally or alternatively be injected by the tracer injection device.

Figure 10:
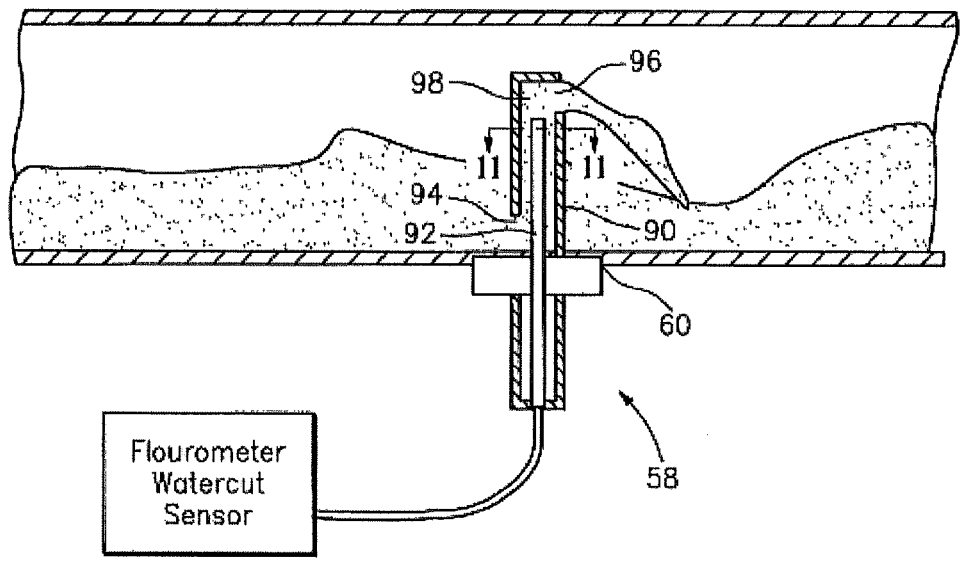
FIG. 10 is an enlarged view of an embodiment of the tracer probe shown in FIG. 9.

FIG. 10 diagrammatically illustrates one embodiment of the flow measurement device 58 shown in FIG. 8. The flow measurement device 58 is configured as a tracer concentration meter and a water cut sensor, and includes a housing 90, a probe 92, and in some instances a fluid flow mixer (e.g., an ultrasonic mixer). The housing 90 is configured for mounting on the pipe wall, and to extend into the flow path of the pipe 22. A flow inlet 94 and a flow exit 96 permit fluid flow 24 through an interior region 98 of the housing 90. The housing 90 is also configured to receive the probe 92 (e.g., a fiber optic-based fluorometer) which is operable to sense the fluid flow 24 and send measurement signals to the processor 34 (or an independent processor in signal communication with the processor). The probe 92 is adapted to sense (i) fluorescence of the hydrophilic and hydrophobic tracers, and (ii) speed of sound of the fluid flow 24 within the housing 90, and to produce measurement signals indicative of the measured fluorescence and speed of sound.

During operation of the present system, the tracer injection device 50 injects one or both of the hydrophilic and hydrophobic tracer(s) into the process flow 24. The hydrophilic tracer mixes with the water component of the process flow 24. The hydrophobic tracer mixes with the oil component of the process flow 24.

The diluted process flow (i.e., the process flow mixed with the hydrophilic and hydrophobic tracers) is sampled via a quantity of the process flow 24 passing through the housing 90. In those embodiments that include a fluid mixer, the fluid mixer is operable to mix the diluted oil and water components of the process flow together to ensure substantially uniform mixing of the respective tracer with the sampled process flow.

Figure 11:
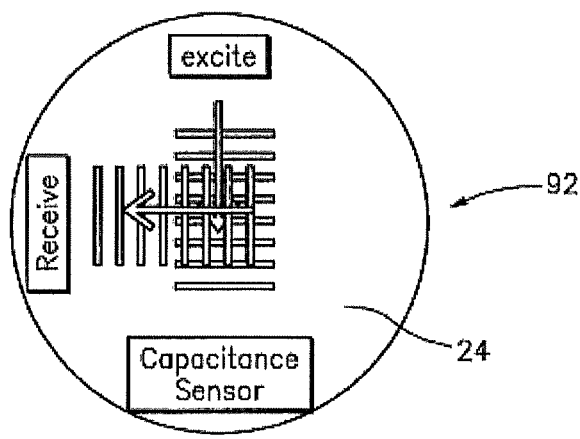
FIG. 11 is a diagrammatic cross-section of the probe in FIG. 10, illustrating the functional operation of the probe.

In the embodiment shown in FIG. 11, the probe 92 is operable to produce a light signal at one or more frequencies that excite the hydrophobic and hydrophilic fluorescent tracers within the process flow 24. The excited tracers emit light (i.e., fluoresce) at distinct emission frequencies. The probe 92 is further operable to sense the light emitted from each fluorescent tracer and produce signals representative of the sensed light. The probe 92 is further operable to measure the speed of sound (SOS) in the sampled process flow (e.g., ultrasonically), and produce signals representative of the SOS in the sampled fluid flow 24 to the processor 34.

The processor 34 is adapted to determine a concentration of each tracer in the mixed process flow using the measurement signals. The tracer concentrations can be determined, for example, as a function of the quantity of photons emitted by each tracer. The quantity of photons emitted by each tracer is proportional to a quantity of molecules in a given volume of the sampled process flow. The respective measured concentrations of the hydrophobic and hydrophilic tracers, therefore, can be given as follows:

$$C_{measured(hydrophobic)} = moles_{tracer(hydrophobic)}/(moles_{water} + moles_{oil}),$$ (Eqn. 3)

$$C_{measured(hydrophilic)} = moles_{tracer(hydrophilic)}/(moles_{water} + moles_{oil}).$$ (Eqn. 4)

The concentration in the each tracer's phase can be given as follows:

$$C_{tracer(hydrophobic)in\ water} = moles_{tracer(hydrophobic)}/moles_{water},$$ (Eqn. 5)

$$C_{tracer(hydrophilic)in\ oil} = moles_{tracer(hydrophilic)}/moles_{oil}.$$ (Eqn. 6)

The hydrophobic concentration equations 3 and 5 can be combined (or re-arranged) as follows:

$$C_{tracer(hydrophobic)in\ water} = (moles_{water} + moles_{oil})/moles_{water} * C_{measured(hydrophobic)}.$$ (Eqn. 7)

In some embodiments, the processor 34 is also adapted to determine the water cut of the mixed process flow 24 using the measurement signals (e.g., the measured speed of sound) and known water cut measurement techniques. It should be noted, however, that the water cut of the sampled process flow may be significantly different than the produced water cut. The hydrophobic concentration equation 5 can be combined (or re-arranged) with the determined watercut as follows:

$$C_{tracer(hydrophobic)in\ water} = C_{measured(hydrophobic)}/Watercut$$ (Eqn. 8)

Using known tracer dilution theory techniques, the flow rate of the water component of the process flow can be given as follows:

$$Q_{water} = Q_{injectionWaterTracer}(C_{tracer(hydrophobic)injected}/C_{tracer(hydrophobic)\ in\ water})$$ (Eqn. 9)

The processor 34 can be adapted to determine the flow rates of the water and/or oil component(s) of the sampled process flow by combining (or re-arranging), for example, equations 8 and 9 as follows:

$$Q_{water} = Q_{tracer(hydrophobic)injected} * Watercut * (C_{tracer(hydrophobic)injected}/C_{measured(hydrophobic)})$$ (Eqn. 10)

$$Q_{oil} = Q_{tracer(hydrophilic)injected} * (1 - Watercut) * (C_{tracer(hydrophilic)injected}/C_{measured(hydrophilic)})$$ (Eqn. 11)

While various embodiments of the flow monitoring system have been disclosed, it will be apparent to those of ordinary skill in the art that many more embodiments and implementations are possible within the scope of the invention. For example, the various meters can be arranged in different orientations upstream of, between, or downstream of the tracer measurement system 28 components. Additionally, the Venturi meter illustrated in FIGS. 4 and 5 can be replaced with any suitable non-intrusive differential pressure meter(s). Accordingly, the present invention is not to be restricted except in light of the attached claims and their equivalents.

What is claimed is:

1. A method of monitoring a multiphase fluid flow passing within a pipe, which fluid flow includes a gas component, an oil component, and a water component, the method comprising the steps of:

providing a flow pressure value and a flow temperature value for the fluid flow within the pipe;

sensing the fluid flow with a fluid flow meter operable to be attached to an exterior of the pipe, the flow meter including a spatial array of at least two sensors disposed at different axial positions along the pipe, and producing flow velocity signals indicative of a velocity of the fluid flow passing within the pipe;

selectively injecting at least one tracer into the fluid flow passing within the pipe, at a known injection flow rate and concentration;

sensing a sample of the fluid flow for the at least one tracer, and producing tracer concentration signals indicative of the concentration of the at least one tracer in the fluid flow;

determining one or more of a gas component flow rate, an oil component flow rate, and a water component flow rate, using one or more of the flow pressure value, the flow temperature value, the flow velocity signals, and the tracer concentration signals.

2. The method of claim 1, wherein the at least one tracer includes a hydrophilic tracer and a hydrophobic tracer, and each are injected into the fluid flow passing within the pipe at a known injection flow rate and concentration.

3. The method of claim 2, wherein the hydrophilic tracer is a fluorescent tracer, and the hydrophobic tracer is a fluorescent tracer, and the step of sensing a sample of the fluid flow for the at least one tracer includes sensing for light emitted by one or both of the hydrophilic tracer and the hydrophobic tracer.

4. The method of claim 1, wherein the step of sensing the fluid flow with a fluid flow meter includes emitting ultrasonic signals into the fluid flow and receiving the ultrasonic signals after such signals have traversed the fluid flow within the pipe.

5. The method of claim 1, further comprising the step of determining a composition of the fluid flow using an equation of state model.

6. The method of claim 1, further comprising the step of selectively extracting the sample of the fluid flow and disposing the sample in a separation chamber prior to sensing the sample for the at least one tracer.

7. The method of claim 6, wherein the steps of selectively extracting and sensing the sample of the fluid flow include passing the sample into the separation chamber fluidly connected to the pipe via a fluid connector, sensing the sample within the separation chamber, and subsequently returning the sample into the pipe through the fluid connector.

8. The method of claim 1, further comprising the step of calibrating the step of determining one or more of a gas component flow rate, an oil component flow rate, and a water component flow rate, using the tracer concentration signals.

9. An apparatus for monitoring a multiphase fluid flow passing within a pipe, which fluid flow includes a gas component, an oil component, and a water component, the apparatus comprising:
- a fluid flow meter operable to be attached to an exterior of the pipe, the flow meter including a spatial array of at least two sensors disposed at different axial positions along the pipe, which flow meter is adapted to produce flow velocity signals indicative of a velocity of the fluid flow passing within the pipe;
- a tracer measurement system including a tracer injection device and a tracer measurement device, which tracer injection device is operable to inject one or more tracers into the fluid flow disposed within the pipe, and which tracer measurement device is connected to the pipe downstream of the tracer injection device, and is operable to sense a sample of the fluid flow for the one or more tracers, and is operable to produce tracer concentration signals representative of a concentration of one or more of the tracers within the sample; and
- a processing device adapted to receive the flow velocity signals and the tracer concentration signals and determine one or more of a gas component flow rate, an oil component flow rate, and a water component flow rate, using one or more of a flow pressure value, a flow temperature value, the flow velocity signals, and the tracer concentration signals.

10. The apparatus of claim 9, wherein the one or more tracers include a hydrophilic tracer and a hydrophobic tracer.

11. The apparatus of claim 10, wherein the hydrophilic tracer is a fluorescent tracer, and the hydrophobic tracer is a fluorescent tracer, and the tracer measurement device is operable to interrogate the sample with light at a wavelength that causes one or both fluorescent tracers to produce a fluorescent emission, and the tracer measurement device is further operable to sense for the fluorescent emission.

12. The apparatus of claim 9, wherein the at least two sensors within the fluid flow meter are each operable to emit ultrasonic signals that traverse the fluid flow within the pipe, and receive ultrasonic signals that have traversed the fluid flow within the pipe.

13. The apparatus of claim 9, wherein the processing device is adapted to include an equation of state model operable to determine a composition of the fluid flow.

14. The apparatus of claim 9, wherein the tracer measurement device includes a separation chamber, which separation chamber includes a first port disposed proximate a first end of the separation chamber, a gas flow port disposed proximate a second end of the separation chamber, and a fluid pressure source, wherein the first port is fluidly connected to the pipe via a fluid connector and fluid sample can pass into or out of the separation chamber through the first port.

15. The apparatus of claim 14, wherein the separation chamber further includes a first port valve and a gas flow port valve.

16. The apparatus of claim 14, wherein the separation chamber further includes a second port disposed between the first port and the gas flow port, wherein the second port is fluidly connected to the pipe via a fluid connector and fluid sample can pass into or out of the separation chamber through the second port.

17. The apparatus of claim 16, wherein the separation chamber further includes a first port valve, a second port valve, and a gas port valve, and wherein the processing device is adapted to selectively operate the first port valve, second port valve, and gas port valve, to extract fluid flow sample from the pipe, and return fluid flow sample to the pipe.

18. The apparatus of claim 17, wherein the separation chamber is operable to selectively remove at least a portion of one or more of the gas component, the oil component, and the water component from the sample.

19. The apparatus of claim 9, wherein the tracer measurement device includes a housing having a fluid flow inlet and a fluid flow exit that permit fluid flow through an interior region of the housing, and a probe that extends into the interior region of the housing, wherein the probe is adapted to sense fluorescent signals from at least one of the one or more tracers, and produce signals representative of a concentration of the at least one of the one or more tracers within the fluid flow.

20. The apparatus of claim 19, wherein the probe is further adapted to sense a speed of sound of the fluid flow.

* * * * *